US00RE38840E

(19) United States
(12) Reissued Patent
Patterson

(10) Patent Number: US RE38,840 E
(45) Date of Reissued Patent: Oct. 18, 2005

(54) SURF- OR SAIL-BOARD AND METHOD OF PRODUCING THE SAME

(75) Inventor: Colin Patterson, Dachau (DE)

(73) Assignee: Peter Rapp, Munich (DE); part interest

(21) Appl. No.: 10/094,381

(22) Filed: Mar. 8, 2002

Related U.S. Patent Documents

Reissue of:
(64) Patent No.: 6,068,531
Issued: May 30, 2000
Appl. No.: 09/000,477
Filed: Apr. 14, 1998

(51) Int. Cl.[7] ..... B63B 35/79
(52) U.S. Cl. ..... 441/74; 441/79
(58) Field of Search ..... 441/74, 79; 114/140, 114/39.14, 39.15, 39.2

(56) References Cited

U.S. PATENT DOCUMENTS

| | | | | |
|---|---|---|---|---|
| 3,160,897 A | * | 12/1964 | Kelly, Jr. | 441/74 |
| 3,516,099 A | * | 6/1970 | Morey et al. | 441/79 |
| 4,320,546 A | * | 3/1982 | Knox | 441/74 |
| 4,325,154 A | * | 4/1982 | Collum, Jr. | 441/74 |
| 4,708,675 A | * | 11/1987 | Shoeffler et al. | 441/65 |
| 4,798,549 A | * | 1/1989 | Hirsch | 441/74 |
| 4,804,347 A | * | 2/1989 | Ross | 441/79 |
| 4,846,745 A | * | 7/1989 | Lobe | 441/79 |
| 4,955,835 A | * | 9/1990 | Hollingsworth | 441/74 |
| 4,964,825 A | * | 10/1990 | Paccoret et al. | 441/74 |
| 5,133,681 A | * | 7/1992 | Lobe | 441/79 |
| 5,152,705 A | * | 10/1992 | Rock | 441/74 |
| 5,176,553 A | * | 1/1993 | Tuttle | 441/79 |
| 5,603,645 A | * | 2/1997 | Saccomanno | 441/65 |

FOREIGN PATENT DOCUMENTS

| | | | |
|---|---|---|---|
| DE | 3206057 | * 2/1984 | |
| DE | 3612775 | * 10/1987 | |
| DE | 4105990 | * 11/1991 | |
| DE | 4121541 | * 2/1992 | |
| DE | 4122000 | * 10/1992 | |
| EP | 0460438 A2 | * 12/1991 | |
| FR | 2639897 | * 6/1990 | 441/79 |
| WO | WO 87/04399 | * 7/1987 | |
| WO | WO 95/31366 | * 11/1995 | |

OTHER PUBLICATIONS

"Finnenkasten: Kampf der Systeme (Tuttle Box)", Surf Magazine, Jul., 1991, pp. 29–31.*

6 pages labeled R–1, R–2, R–3, R–4, R–5, and R–6 (5 pages of black and white photographs labeled pp. R–1 through R–5 and 1 page technical drawing, end view, labeled p. R–6) showing a fin system. This fin system was obtained from a French fin manufacturer, Mr. Phillip Barland, in France in Sep. 1998.

* cited by examiner

*Primary Examiner*—Ed Swinehart
(74) *Attorney, Agent, or Firm*—Pearne & Gordon LLP

(57) ABSTRACT

Surfboard having an essentially elongate, flat basic body which is capable of floating and, during use, rests with its underside on the water, and on whose upper side there is provided a standing surface for the feet of the sports person using the board, and in which at least one fin is attached to the underside. An opening extending from the underside towards the upper side is provided in the basic body for receiving the said fin, whose extent in the transverse direction of the board, that is to say transversely to the direction of travel and transversely to the surface plane of the fin, is less than the cross-section of the fin; the outer edges of the fin cross-section at the connection point to the board are preferably designed in such a way that the outer edges rest essentially completely against the underside of the board.

27 Claims, 7 Drawing Sheets

SURF- OR SAIL-BOARD AND METHOD OF PRODUCING THE SAME

Matter enclosed in heavy brackets [ ] appears in the original patent but forms no part of this reissue specification; matter printed in italics indicates the additions made by reissue.

FIELD OF THE INVENTION

The present invention relates to a surfboard or sailboard and a method for the manufacture thereof.

BACKGROUND OF THE INVENTION AND DESCRIPTION OF RELATED ART

A surfboard is to be understood to mean all customary, essentially flat floating bodies which are suitable for surfing. Sailboards are understood to be the essentially flat floating bodies which are or can be fitted with a sail and are used for windsurfing and the like. For reasons of simplicity, the invention is described below by way of the example of a surfboard for surfing. However, it is pointed out that this does not mean any restriction for the applicability of the invention.

To stabilize the direction, surfboards and sailboards require a so-called fin, a plate which is often of essentially triangular design and whose plane is arranged essentially parallel to the plane of the direction of travel. In addition to the triangular basic shape of the fin, there are numerous modifications, e.g. a design in the manner of the centreboard of a sailing boat, a design in which lines are greatly curved counter to the direction of travel, etc. In addition to the triangular basic shape, rectangular or trapezoidal shapes with straight or curved side edges are also possible.

Surfboards and sailboards are generally made of a plastic material, for example epoxy resin, ABS or similar materials which form the actual rump or body and surround a core made of foamed material, such as polystyrene or polyurethane. Since, for various reasons, the boards have to be designed to be as light as possible, the actual plastic skin can also be of not very thick construction. This therefore causes the problems of mounting the fins on the board with sufficient strength.

In a known type of attachment for fins, an approximately cylindrical depression is arranged on the underside of the board, into which depression the fin is inserted with an elastic bracket of correspondingly cylindrical design. The bracket is expanded by a screw and is thus clamped firmly in the cylindrical depression. However, this type of attachment has the disadvantage that it does not ensure a sufficiently secure attachment, and that it furthermore does not allow the position of the fin to be corrected in relation to the board. An adaptation of the fin position with regard to different external conditions is thus not possible.

An adjustable fin for a surfboard was disclosed by U.S. Pat. No. 4,846,745. This fin is held in a groove which is arranged on the underside of the surfboard and has clamping devices for the attachment of the fin.

U.S. Pat. No. 4,421,492 likewise shows a fin which is adjustable in the longitudinal direction of the board, and in which a longitudinal groove is likewise recessed into the board. The fin can be displaced back and forth in holding grooves by means of pins and is held in the desired position by a spring-mounted part which engages in catch depressions on the underside of the groove. U.S. Pat. No. 4,044,416 also shows a similar construction to the two patents described above.

The abovementioned designs have the disadvantage that, on the one hand, they are relatively complicated and that, on the other hand, the strength leaves much to be desired.

The object of the present invention is therefore to provide a surfboard or sailboard with a fin which can be mounted in a simple and reliable manner, and in which, at the same time, the connection between the fin and the surfboard has a high strength. According to a subsidiary aspect of the invention, it should also be possible to change the position of the fin in a simple manner.

It is furthermore the object of the invention to provide a method for the manufacture of such a surfboard or sailboard.

According to the invention, the object is achieved by the subject-matter defined in the claims. The method according to the invention is also defined in the claims.

SUMMARY OF THE INVENTION

The surfboard or sailboard according to the invention has an essentially elongate, flat basic body which is capable of floating, rests with its underside on the water, and on whose upper side there is provided a standing surface for the feet of the sports person using the board. At least one fin is attached to the underside.

An opening extending from the underside towards the upper side is provided in the basic body for receiving the said fin. The extent of this opening in the transverse direction of the board, that is to say transversely to the direction of travel and transversely to the surface plane of the fin itself, is less than the cross-section of the fin at this point. Furthermore, the outer edges of the fin cross-section at the connection point to the board are designed such that the outer edges rest essentially completely against the underside of the board.

It is achieved by this design that no projections, depressions or the like are provided on the underside of the board or on the fin, which have an influence on the course of flow of the water which flows around the fin and the underside of the board.

The actual attachment is effected by the fin being screwed to the board from above through the said opening.

This design has the considerable advantage that the attachment does not take place in the board itself. The strength of the fin is thus essentially independent of the strength of the plastic outer skin and also of the plastic foamed material. The region in which the opening is arranged merely has to be designed in such a way that the compressive stresses produced by the screw connection are reliably absorbed. The customary plastic foamed materials are very sensitive to tensile loads, but can withstand compressive loads comparatively well. The design therefore lends itself particularly to these material properties.

A screw connection fed through the board from above can be designed to be simple and easily accessible for the user. As a result, the fins can be removed in a simple manner which, for example, considerably facilitates transportation of the board. Furthermore, it is not a problem to exchange the fins in the event of fins of a given size being required for the respectively prevailing conditions of use, and it is likewise simple to exchange the fin quickly in the event of a breakage or the like.

According to a preferred further development of the invention, the opening through which the fin is screwed is designed as a slot which extends essentially in the longitudinal direction of the board. This design has the particular advantage that the position of the fin can be changed in relation to the sailboard. The slot is preferably designed such that it is completely covered by the fin even if the fin is in an extreme position defined by the ends of the hole. As a result, the fin can be implemented as an adjustable fin which, in contrast to the designs in the abovementioned prior art, does not affect the flow conditions on the underside of the board.

In particular, but not exclusively in the latter construction shown, the fin is preferably provided with an extension which engages in the slot. This extension has the advantage that it transmits any torque, which occurs during loading of the fin, to the board over a large area, thus avoiding damage to the board and fin.

The method according to the invention envisages providing a plastic body which is received in the surfboard, i.e. in the foamed material of the surfboard, and which has a first depression which is open towards the upper side of the board and in which the attachment, that is to say for example the screw head, is received, a second depression which is open towards the underside of the board, and an opening which connects the said first and the said second depression to one another.

According to a first preferred refinement of the method according to the invention, this plastic body is laminated into the board after the foaming of the board. For this purpose, depressions are milled into the board and, with correspondingly designed mouldings, glass-fibre mats impregnated with synthetic resin or the like are inserted and brought into shape.

According to a second preferred alternative of the method according to the invention, the plastic body is produced in advance, specifically preferably by an injection moulding method. This embodiment of the method according to the invention considerably reduces the expenditure for the manufacture of a surfboard. The injection-moulded moulding is inserted in a suitable manner into the mould for the manufacture of the surfboard and is then foamed in during the manufacturing process. This results in a firm connection between the foam and the moulding.

By the use of the prefabricated plastic body, the force exerted by the fin attachment on the surfboard is considerably reduced and is essentially absorbed evenly by the foam. As a result, the strength requirements placed on the surfboard are reduced, such that it is possible to manufacture the surfboard without a plastic body. The surfboard then consists only of the corresponding foamed body, which considerably reduces the manufacturing costs. However, in this case it is possible to provide a part of the outer surface of the surfboard, in particular the standing surface for the user, with a plastic covering in order to increase the strength in this region or to achieve specific technical (high friction) or visual (specific colourings) properties.

The fin used according to the invention can likewise be made up as a laminate of fibre-reinforced plastic material. The attachment device is preferably implemented by a brass thread part also being laminated into the fin, which thread part interacts with a screw which is screwed to the fin through the moulding.

As an alternative thereto, the fin can also be manufactured as a plastic injection moulding. In this case, a suitable threaded bolt made of brass or the like is likewise inserted into the mould prior to manufacture and is also cast in.

BRIEF DESCRIPTION OF THE DRAWINGS

Further advantages, features and potential uses of the present invention emerge from the following description in conjunction with the figures, in which:

FIG. 1b: shows a side view of the exemplary embodiment according to FIG. 1a;

FIG. 1c: shows a bottom view of the exemplary embodiment according to FIG. 1a;

DESCRIPTION OF THE PREFERRED EMBODIMENTS OF THE INVENTION

Figure 1A:
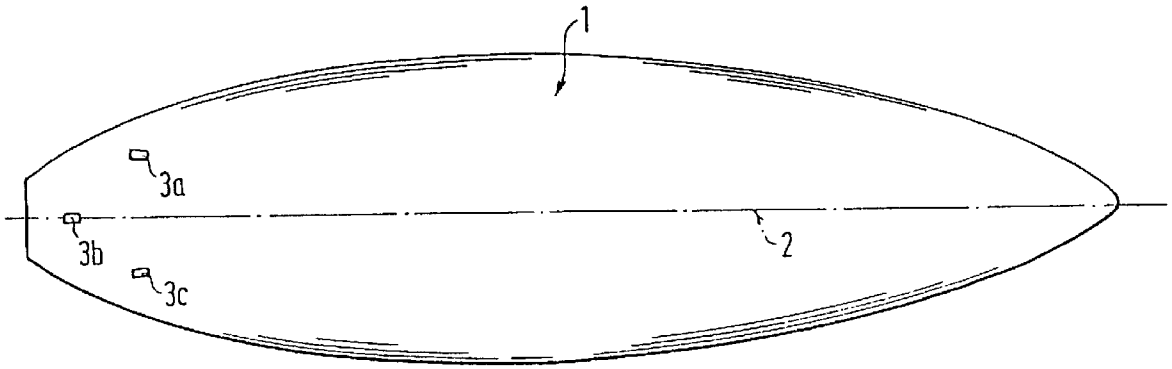
FIG. 1a: shows a top view of a surfboard as an exemplary embodiment of the present invention, the fin having been omitted.

FIG. 1a shows the top view of a surfboard 1 which is arranged essentially symmetrically to an axis 2 running in the longitudinal direction.

In the rear region of the surfboard there are three slots 3a, 3b and 3c, the slots 3a and 3c enclosing with their longitudinal axes an acute angle relative to the longitudinal axis 2, while the slot 3b is arranged symmetrically to the longitudinal axis.

Figure 1B:
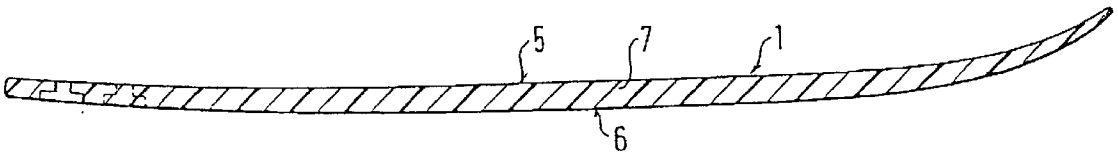

FIG. 1b shows a section through the surfboard according to FIG. 1a, 5 denoting the upper side of the surfboard on which the user stands and 6 denoting the underside which faces the water.

Figure 1C:
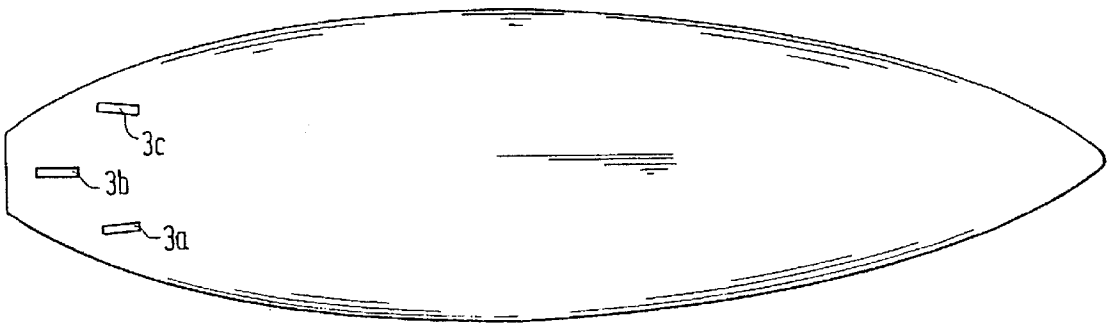

FIG. 1c shows a bottom view, the slots 3a, 3b and 3c also being visible here.

Figure 2:
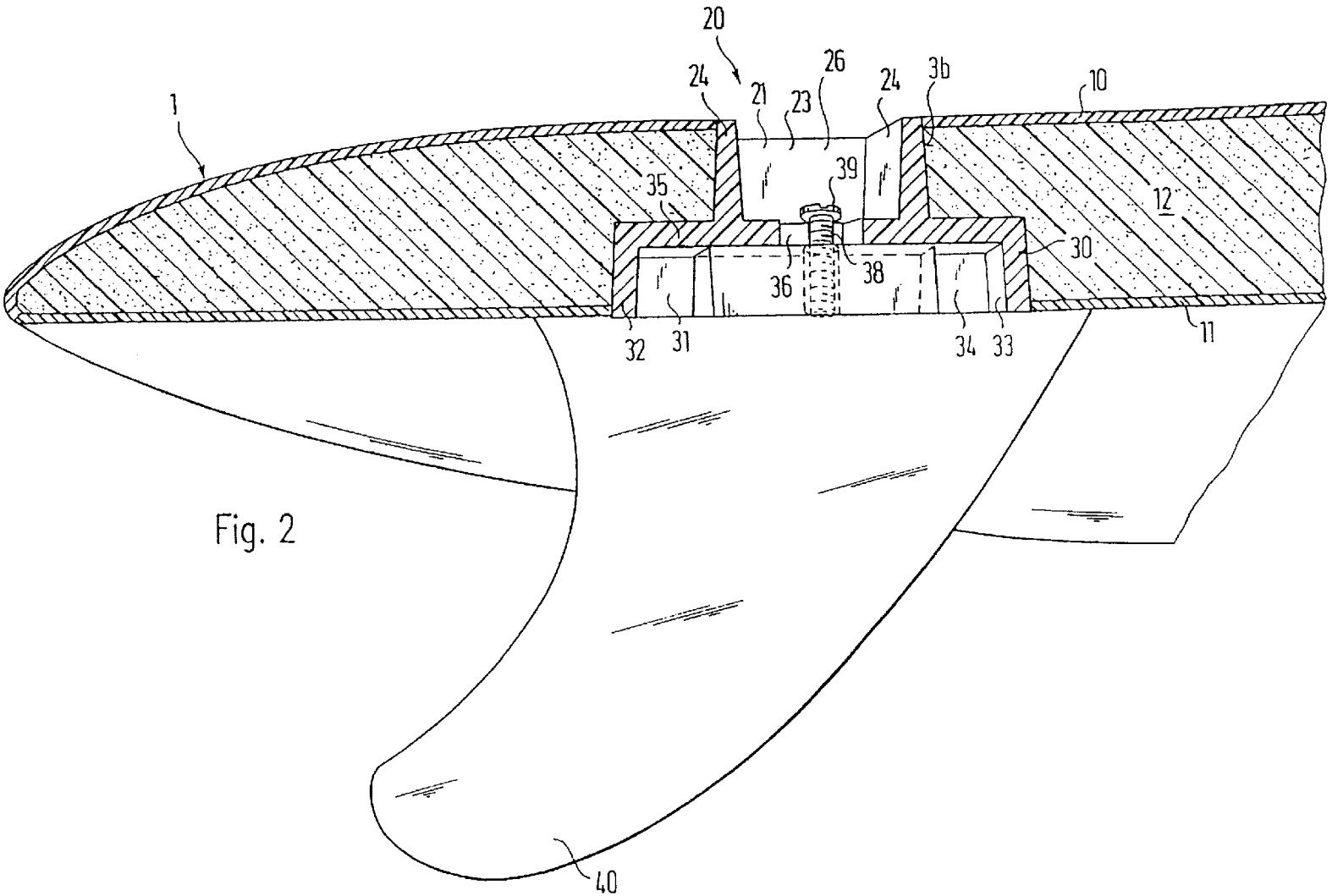
FIG. 2: shows a partially sectional side view of the exemplary embodiment according to FIG. 1 with a mounted fin.
Figure 3:
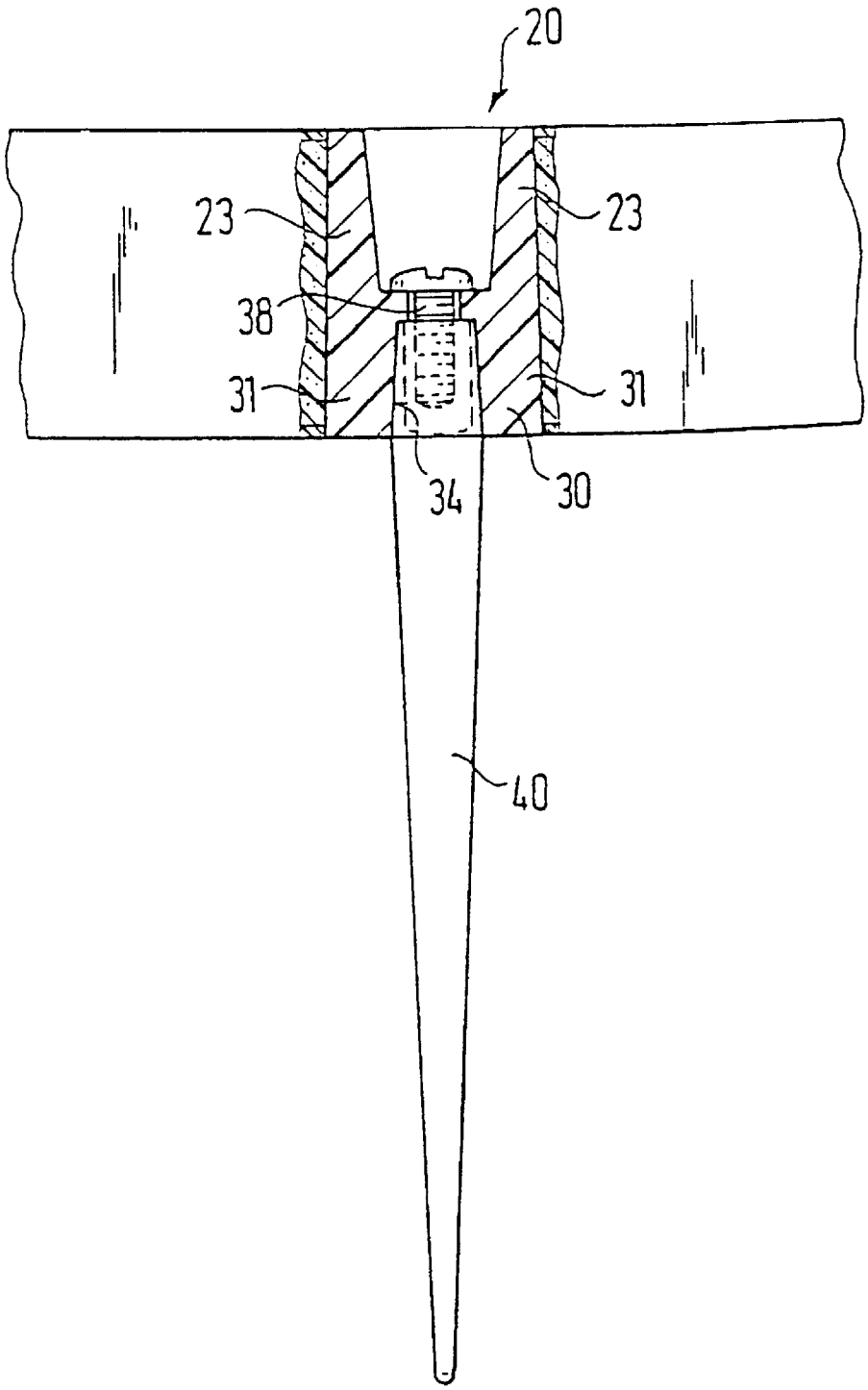
FIG. 3: shows a partially sectional end view of the exemplary embodiment according to FIG. 2.
Figure 4B:
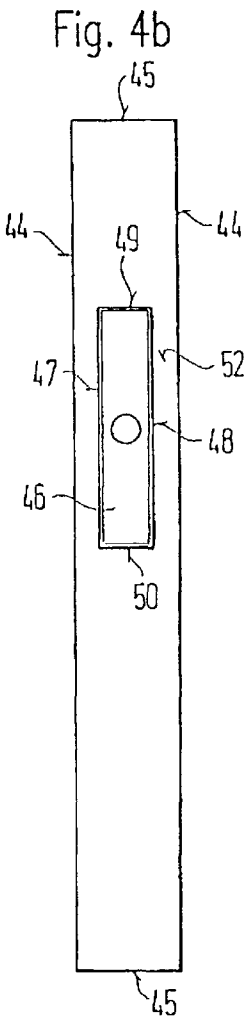
FIG. 4b: shows an illustration of the fin as is used in the exemplary embodiment according to FIGS. 2 and 3 in a top view.
Figure 4A:
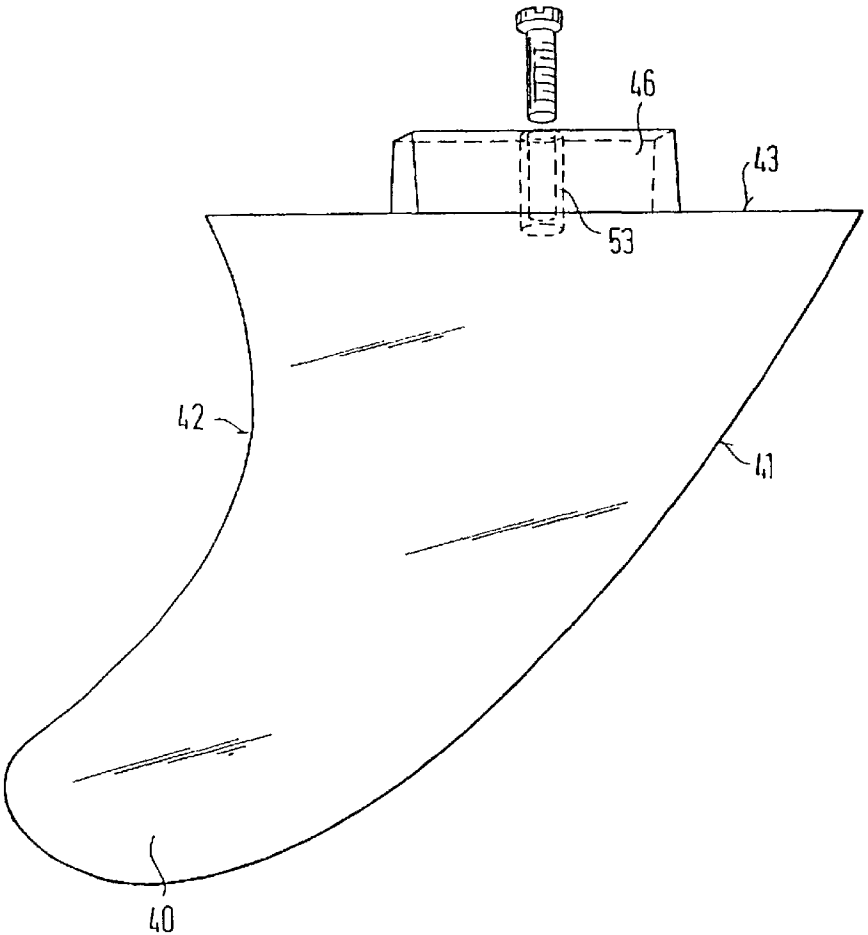
FIG. 4a: shows an illustration of the fin, as is used in the exemplary embodiment according to FIGS. 2 and 3 in a side view.

FIG. 2 shows a section through the surfboard along the axis of symmetry of the slot 3b running in longitudinal directions.

As can be seen in this section, the surfboard 1 consists of a plastic upper shell 10, a plastic lower shell 11 and a foamed body 12 arranged between them. In the exemplary embodiment, the plastic upper shell and lower shell are produced from glass-fibre-reinforced synthetic resin and the foamed body 12 consists of polyurethane.

Figure 7:
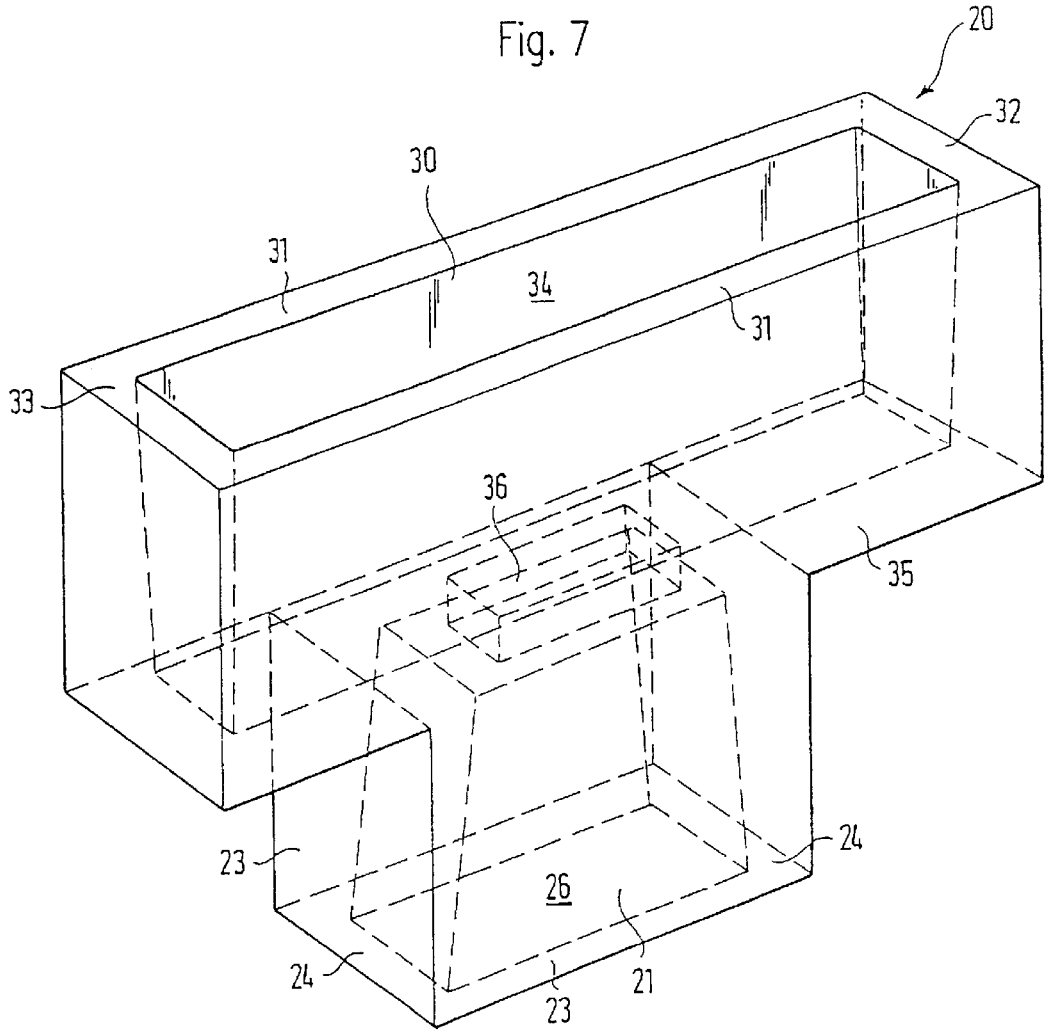
FIG. 7: shows the fin box of the exemplary embodiment according to FIG. 2 in a diagrammatic perspective view.

Recessed into this foamed body is the fin box designed according to the invention which, in this exemplary embodiment, represents an externally injection-moulded component, as is illustrated in detail in FIG. 7.

The fin box denoted in total by 20 has a box top part 21 which consists of two opposite side walls 23 which are connected to one another by short cross walls 24 and which form an opening 26 which is open towards the top.

Designed integrally with this box top part is the box bottom part 30 which consists of two longitudinal side walls 31 running essentially in the longitudinal direction and of two short cross walls 32 and 33 which connect them and surround an insertion opening 34.

Towards the top, the fin bottom box is covered by an intermediate plate 35 which, at the same time, also terminates the fin top box 21 towards the bottom.

Arranged in the intermediate plate 35 is a slot 36 which extends essentially in the longitudinal direction and whose width is wide enough to receive a threaded screw 38. This threaded screw is provided with a head 39 which is suitable for the engagement of a tool, for example a screwdriver, and whose diameter is wider than the width of the slot 36.

The fin 40 has a front edge 41 which slopes essentially towards the rear in the assembled state and is curved towards the rear and a rear curved edge 42. The front edge 41 and the edge 42 are rounded in a suitable manner, as is customary in the case of wings and the like against which there is flow in order to reduce the flow resistance.

The upper edge 43 of the fin has such a design that, in the assembled state, the fin rests completely against the usually curved underside 6 of the surfboard.

For this purpose, at least the side edges 44, running in the longitudinal direction, and the transverse edges 45, running in the transverse direction of the edge 43 which terminates the fin at the top are adapted in their shape precisely to the course of the surface of the underside of the surfboard.

Additionally, a suitably designed intermediate sealing layer *19* may be provided between the fin and the surfboard. A water-resistant elastic material, for example rubber or an elastic plastic material, is used as material for this intermediate sealing layer *19*. The intermediate sealing layer *19* is preferably cut in a shape which corresponds to the surface of the fin facing the surfboard, and which has appropriate cutouts for the lower opening of the fin box. As an alternative thereto, a depression may also be provided in the upper surface of the fin, which depression receives a sealing ring made of elastic material, such as rubber and the like.

A journal 46 is formed on the fin, integrally therewith, parallel to the longitudinal edge 44. The journal 46 is of cuboid design and has mutually parallel side surfaces 47, 48 and mutually parallel end faces 49. The thickness of the journal transversely to the longitudinal direction of the board in the assembled state, i.e. the distance between the outer surfaces 47 and 48, is smaller than the thickness of the fin, i.e. the distance between the outer surfaces 44 of the fin. As a result, a web denoted by 52 is produced between the journal and the upper edge of the fin. In the exemplary embodiment, the side surfaces of the journal are inclined slightly towards one another, that is to say arranged conically, the opening in the underside of the fin box also being of correspondingly conical design. By virtue of this design, the fin is clamped firmly in the opening.

A threaded bolt 53 is made in the journal 46 of the fin 40. In the exemplary embodiment, this threaded bolt consists of a brass sleeve, and the associated attachment screw consists of special steel.

The functioning of this exemplary embodiment is as follows:

The fin 40 is inserted into the box bottom part 30 with the journal 46. In this case, the dimension of the box bottom part, and in particular the distance between the longitudinal side walls 31, is such that the journal 46 can move forwards and backwards within the box part. A lateral movement of the journal in relation to the box bottom part is ruled out. The screw 38 is introduced into the box top part from above and is inserted through the slot 36 and screwed into the brass sleeve. Since the head of the screw is wider than the width of the slot, the journal of the fin is thus moved in the direction of the intermediate plate.

The height of the journal, viewed parallel to the longitudinal axis of the screw, is preferably slightly lower than the height of the box bottom part, likewise viewed in the same direction. It is thus brought about that it is not the upper surface of the journal 46 which comes into contact against the intermediate plate, but that the upper edge 45 of the fin is pressed against the underside of the board by the force imposed by the screw.

If a seal is used between the fin and the underside of the board, the insertion opening 34 of the fin bottom box 30 and the journal 40 of the fin must be appropriately designed so that the required pressing force for sealing is achieved when the fin is screwed.

If the fin is to be displaced in its position, it is sufficient to loosen the screw 38 slightly, displace the fin and screw it tight again.

In this exemplary embodiment, as is illustrated in FIG. 7, the fin box is produced separately, preferably as a plastic injection moulding and is foamed into the surfboard during the manufacture thereof. In this manner, a very firm connection with the surfboard is produced, by means of which connection the prevailing forces can be reliably absorbed. Since the design of the fin box according to the invention ensures that the loads on the foam are imposed in total over a large area as compressive loads, the strength is considerably increased compared to known designs.

The method for the manufacture of the surfboard is then arranged in such a way that a mould to be opened is provided, which has an upper and a lower mould cavity which is designed to correspond to the contour of the basic body of the surfboard. The prefabricated fin box is inserted into the mould. Before, during or after the closing of the mould, a suitable foaming liquid is introduced into the mould, which foaming liquid expands and then completely fills the volume of the mould. The plastic upper shell and lower shell 10, 11 according to the exemplary embodiment shown in FIG. 1 are usually also manufactured at the same time as the mould.

Owing to the reduced strength requirements for the fin attachment, which results from the foaming in of the prefabricated fin box, this plastic upper shell and plastic lower shell can also be omitted. The surfboard then consists in total of the foamed material, which is produced form a suitable expansion medium, and the fin box made of plastic which is recessed therein. It is possible by suitable selection of the expansion medium, the quantity and the temperature of the production process to ensure that the surface of the surfboard manufactured in this way has the necessary properties. Furthermore, a correspondingly designed plate, which is provided, for example, in the region of the standing surface of the surfer, can also be foamed in or foamed on using the foaming process in order to increase the strength in this region.

In addition to the manufacturing mould with a separately manufactured fin box, a corresponding mould can also be manufactured by laminating directly during the manufacture of the surfboard, as will now be described with reference to FIG. 5 and FIG. 6.

Figure 5B:
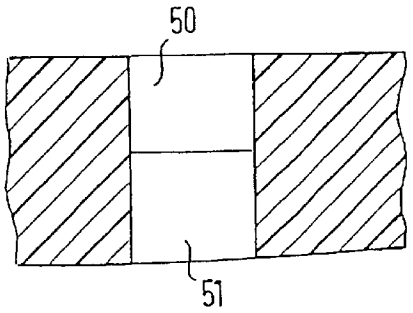
FIG. 5a–d: shows individual stages for the manufacture of a surf board according to the exemplary embodiment according to FIG. 1, FIG. 5a and FIG. 5c showing the manufacturing operation in a partially sectional side view, and FIG. 5b and FIG. 5d showing the manufacturing operation in a partially sectional end view.
Figure 5D:
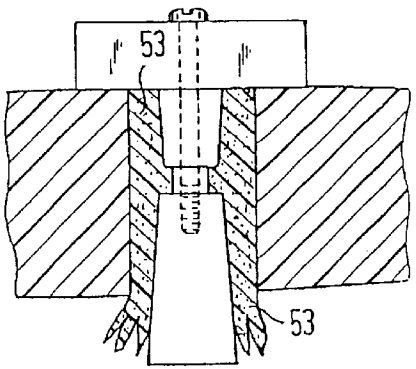
Figure 5A:
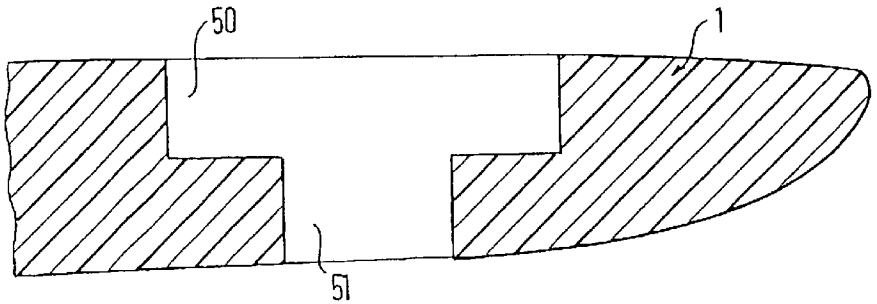

In this embodiment, an upper opening 50 and a lower opening 51 are milled into the surfboard after the foaming operation, as can be seen in FIG. 5a.

The dimensions of these cuts are selected such that the external dimensions of the finished fin box result therefrom.

Figure 5C:
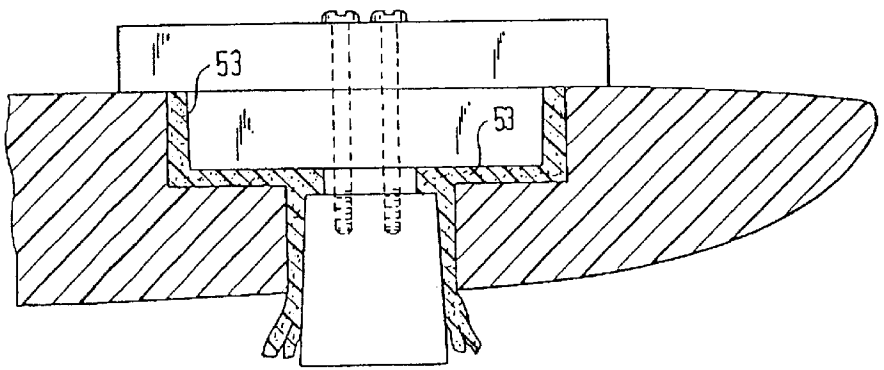

Subsequently, glass-fibre mats 53 are placed in these openings, as can be seen in FIG. 5c and FIG. 5d, these glass-fibre mats being impregnated with the appropriate plastic material. The glass-fibre mats are preferably inserted when, in particular, the plastic bottom part which, in this exemplary embodiment, preferably likewise consists of glass-fibre-reinforced synthetic resin, still has moist laminates.

Figure 6C:
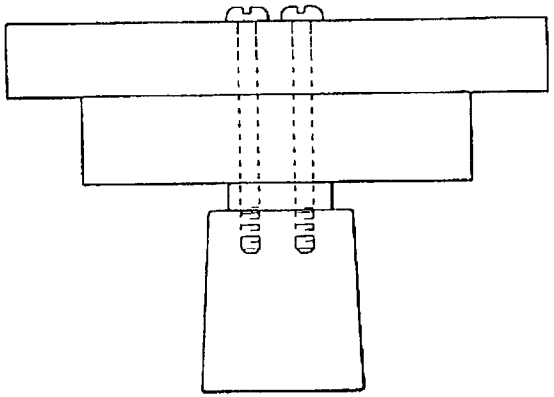
FIG. 6c: shows the apparatus according to FIG. 6a in the assembled state.
Figure 6A:
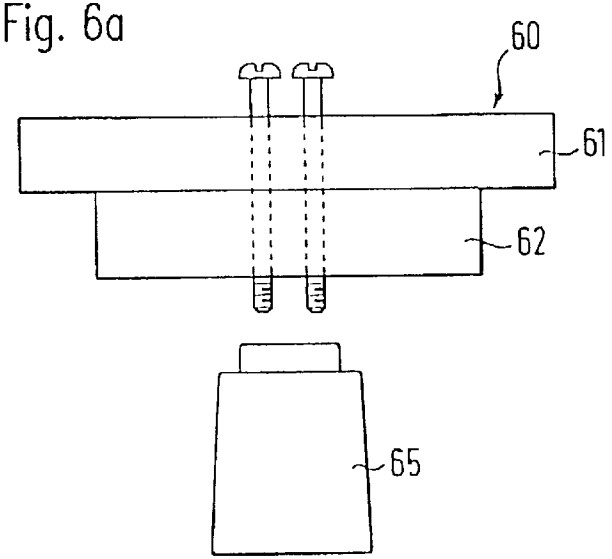
FIG. 6a: shows a side view of an apparatus for the manufacture of the surfboard according to FIGS. 5a to 5d.
Figure 6B:
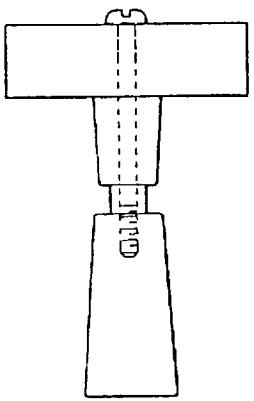
FIG. 6b: shows a view of the apparatus according to FIG. 6a in an end view.

Subsequently, an aluminium moulding is then inserted which, as shown in FIG. 6a to 6c, consists of a top part 60, whose upper part 61 rests on the surfboard during manufacture, and whose lower part 62 corresponds to the finished opening 34 for receiving the fin journal.

An aluminium moulding 65 corresponds to the opening 26 for receiving the screw head 39.

This aluminium moulding, as shown in FIGS. 5c and 5d, is inserted into the surfboard 1 and pressed against the laminates.

After the curing of the laminates, the excess laminate is cut and ground and the upper side and underside of the board are finished as usual.

The advantage of this method of manufacture is that it can be integrated in a simple manner into previously known manufacturing methods. In this case, in particular, it is not necessary to produce a separate injection moulding involving the corresponding tool costs.

In terms of construction, function and also strength, the fin box designed in this way corresponds to the fin box according to the exemplary embodiment, as was described with reference to FIGS. 1 to 3 and 7.

What is claimed is:

1. [Surfboard] *A board* having an essentially elongate, flat basic body *having a longitudinal axis* which is capable of floating and, during use, rests with its underside on the water, and on whose upper side there is provided a standing surface for the feet of [the] *a* sports person using the board, *said board having a fin box penetrating said basic body of said board, said fin box having a cavity therein for receiving a fin,* at least one fin being attached to the underside[, wherein an opening extending from the underside towards the upper side is provided in the basic body for receiving said fin,] *of said board, said fin being received in said cavity of said fin box,*

[said opening being designed in the form of a fin box which penetrates said basic body and,]

said fin being attached in said [opening] *cavity* by an attachment means, [and the] *said* fin box having a box top part which is open towards the upper side of the [surfboard] *board*, and a box bottom part which is open towards the underside of said [surfboard] *board*,

[wherein] a plate [is] *being* arranged *in said fin box* between said [fin top] box *top part* and said [fin bottom] box *bottom part*, [in which] *said* plate [said opening is provided, and through which] *having an opening therethrough,* said attachment means [extends] *extending through said opening in said plate* to engage the fin, *said cavity for receiving said fin being disposed in said box bottom part,*

*wherein said fin has a first surface and a second surface, said first and second surfaces defining a thickness therebetween, each of said first and second surfaces having a proximal region which is proximate to said board, and a distal region which is distal to said board, each of said first and second surfaces extending at least downward from said proximal region thereof to said distal region thereof,*

*wherein when viewed along an edge of said fin in a direction substantially parallel to said longitudinal axis of said board, said proximal region of said first surface of said fin has a substantially linear profile,*

*said board being a surfboard or a sailboard.*

2. [Surfboard] *Board* according to claim 1, wherein the extent of said [opening] *cavity* in the transverse direction of the board, said transverse direction being transversely to the direction of travel and transversely to the surface plane of the fin, is less than the cross-section of the fin, and wherein the outer edges of the fin cross-section at a connection point to the board are designed such that the outer edges rest essentially completely against the underside of the board.

[3. Surfboard according to claim 1, wherein the fin is attached in said opening by an attachment means.]

4. [Surfboard] *Board* according to claim [3] *1*, wherein said opening has a longitudinal extent essentially in the longitudinal direction of the board, which is greater than the extent of the attachment means in the longitudinal direction, so that the attachment means and the fin can be moved in the longitudinal direction in said [opening] *cavity* when said attachment means has been loosened.

5. [Surfboard] *Board* according to claim [3] *1*, wherein said attachment means is a screw which is provided with a screw head, and wherein said opening has a resting surface on which said screw head rests in order to hold said fin.

6. [Surfboard] *Board* according to claim 1, wherein said box top part [consists of] *has* two opposite side walls which are arranged essentially parallel to the longitudinal direction of the [surfboard] *board* and which are connected to one another by two shorter cross walls.

7. [Surfboard] *Board* according to claim 1, wherein said box bottom part has two longitudinal walls running essentially parallel to the longitudinal direction of the [surfboard] *board* and two short cross walls which connect the latter.

8. [Surfboard] *Board* according to claim 1, wherein said fin has a journal which engages in said [opening] *fin box*.

9. [Surfboard] *Board* according to claim 1, wherein said fin has a journal which engages in said [opening] *cavity of said box bottom part of said fin box*, wherein said journal has side walls, [and is of essentially cuboid design, wherein said fin box has] *said cavity having* side walls, [and wherein said opening in said box bottom part is] *said cavity being* designed in such a way that, in the assembled state of said fin, the side walls of said journal rest essentially against the side walls of said [fin box] *cavity*.

10. [Surfboard] *Board* according to claim 1, [wherein] *further comprising* a seal [is provided between the surface of] *provided between* the fin[, which faces] *and* the underside of the [surfboard, and the surfboard] *board*.

11. [Surfboard] *Board* according to claim 1, [wherein an opening provided with] *said attachment means being a threaded attachment means, said fin having* a threaded bore [is provided in said fin] *therein* for engagement of [an] *said threaded* attachment means [provided with a threaded bore].

12. Method for the manufacture of a [surfboard] *board for surfing or windsurfing, said board* having an essentially elongate, flat basic body which is capable of floating and, during use, rests with its underside on the water, and on whose upper side there is provided a standing surface for the feet of [the] *a* sports person using the board, *said board*

*having a fin box penetrating said basic body of said board, said fin box having a cavity therein for receiving a fin,* at least one fin being attached to the underside, [wherein an opening extending from the underside towards the upper side is provided in the basic body for receiving said fin,] *said fin being received in said cavity of said fin box,* wherein firstly the basic body of the [surfboard] *board* consisting of a plastic upper shell, plastic lower shell and foam located between them is manufactured at least to a great extent, wherein cutouts are then made in said basic body, and wherein laminates are then introduced into said cutouts, which laminates, in the cured state, from [a] *said* fin box, and which method uses mouldings which are arranged in said cutouts with said laminates in such a way that, in the cured state, the laminates have the desired shape after removal of said mouldings.

13. Method according to claim 12, wherein said mouldings consist of aluminum.

*14. Board according to claim 1, wherein said fin has a journal which engages in said cavity of said box bottom part of said fin box.*

*15. Board according to claim 8, wherein said journal has at least two opposing side walls that are tapered or inclined toward one another, said tapered opposing side walls of said journal providing an essentially trapezoidal cross-section thereof.*

*16. Board according to claim 15, said cavity of said box bottom part having side walls, said cavity being designed such that, in the assembled state of said fin, the tapered side walls of said journal are pressed essentially against the side walls of said cavity, at least at an entrance to said cavity.*

*17. Board according to claim 16, wherein said side walls of said cavity in said box bottom part are tapered apart from one another in a direction toward the underside of said board, and wherein in the assembled state, said tapered side walls of said journal are pressed against said tapered side walls of said box bottom part.*

*18. Board according to claim 11, said fin having a journal which engages in said cavity of said box bottom part, wherein said threaded bore is provided as a threaded receptacle that is molded into said journal of said fin.*

*19. Board according to claim 18, said threaded attachment means extending through said opening in said plate to be received in said threaded receptacle molded into said journal of said fin.*

*20. Board according to claim 18, wherein said threaded attachment means is a screw.*

*21. Board according to claim 18, wherein said threaded receptacle is a brass sleeve.*

*22. Board according to claim 1, said board being a surfboard.*

*23. Board according to claim 1, said board being a sailboard.*

*24. Board according to claim 9, said journal being of essentially polyhedral design.*

*25. Method according to claim 12, said laminates comprising glass-fibre mats impregnated with a resin material, said method further comprising the step curing said resin-impregnated laminates to form said fin box.*

*26. Method according to claim 25, further comprising the step of cutting or grinding excess laminate following curing of said resin-impregnated laminates.*

*27. Method according to claim 25, said mouldings comprising an upper moulding and a lower molding, wherein said upper and lower mouldings are inserted into said cutouts from said upper side and said underside respectively of said board after introduction of said laminates into said cutouts.*

*28. Method according to claim 27, further comprising the steps of removing said mouldings from said cutouts once said laminates have cured, and cutting or grinding excess laminate to finish said board having said fin box therein.*

* * * * *